US008605268B2

(12) United States Patent
Wu et al.

(10) Patent No.: US 8,605,268 B2
(45) Date of Patent: Dec. 10, 2013

(54) MULTI-CHANNEL SENSOR FOR MEASURING COLORANTS OF PRINTS

(75) Inventors: Wencheng Wu, Webster, NY (US); Edul N. Dalal, Webster, NY (US); Beilei Xu, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 329 days.

(21) Appl. No.: 13/039,013

(22) Filed: Mar. 2, 2011

(65) Prior Publication Data

US 2012/0224872 A1 Sep. 6, 2012

(51) Int. Cl.
*G01N 21/00* (2006.01)

(52) U.S. Cl.
USPC ................................ 356/73; 356/72; 356/402

(58) Field of Classification Search
USPC ............................................ 356/72–73, 402
See application file for complete search history.

(56) References Cited

U.S. PATENT DOCUMENTS 4,649,502 A * 3/1987 Keller et al. .................. 356/402
5,767,980 A * 6/1998 Wang et al. ................... 358/475
5,875,028 A * 2/1999 Lasken et al. ................. 356/244
5,967,033 A * 10/1999 Pfeiffer et al. ................ 101/211
7,295,215 B2 11/2007 Klassen
7,295,703 B2 11/2007 Bala et al.
7,376,269 B2 5/2008 Klassen et al.
7,783,122 B2 8/2010 Wu et al.
2008/0302263 A1 12/2008 Eschbach et al.
2008/0305444 A1 12/2008 Eschbach et al.

OTHER PUBLICATIONS

Wu et al., Imaging Colorimetry Using a Digital Camera, Journal of Imaging Science and Technology, Jul./Aug. 2000, vol. 44, No. 4, pp. 267-279.

* cited by examiner

*Primary Examiner* — Kara E Geisel
(74) *Attorney, Agent, or Firm* — Pillsbury Winthrop Shaw Pittman LLP

(57) ABSTRACT

A sensor used for determining area coverages of each colorant in a printed image is provided. The sensor includes a plurality of sensing elements for determining area coverages of each colorant in a printed image that includes a plurality of colorants including a black colorant. One of the sensing elements is an infrared sensing element configured to measure infrared reflection, and the others of the sensing elements are each configured to detect a visible color.

16 Claims, 8 Drawing Sheets

MULTI-CHANNEL SENSOR FOR MEASURING COLORANTS OF PRINTS

BACKGROUND

1. Field

The present disclosure relates to a sensor having an infrared sensing element and a method for using the sensor to determine colorants in prints.

2. Description of Related Art

In some image printing applications, it is necessary to convert sensor outputs (such as RGB, L*a*b* etc.) to actual area-coverage of the colorants (such as CMYK) in the hardcopy.

One example that requires such conversion is a system that is configured to monitor customer documents being printed in order to detect when calibration, maintenance or other service actions are necessary. For example, such a system is described in detail in U.S. Pat. No. 7,376,269 to R. Victor Klassen and Stephen C. Morgana titled "Method Of Comparing Electronic Images With Scans Of Prints To Detect Image Quality Defects," which is hereby incorporated by reference in its entirety.

Another example that requires such conversion includes Automated Image Quality Diagnostics (AIQD). The AIQD system is invoked when the image printing system/copier senses a problem, when preventive maintenance is desired, or when the operator is not satisfied with machine performance.

In such conversions, the number of colorants (CMYK=4) is typically greater than the number of sensor outputs (RGB=3) available, and therefore the conversion from the sensor outputs to the actual area-coverage of the colorants in the hardcopy is not unique. Assumptions are often made in order to solve this conversion problem. Some methods (e.g., See U.S. Pat. No. 7,295,215 to R. Victor Klassen titled "Method For Calculating Colorant Error From Reflectance Error," which is hereby incorporated by reference in its entirety) have been developed to solve this conversion problem and their accuracy relies heavily on the validity of the assumptions made.

One approach to solve this conversion problem is to assume a given Gray Component Replacement (GCR) strategy, which provides a relationship between the amount of K and the amount of CMY. This approach may be acceptable for some image printing applications such as color management with pre-specified GCR but does not work for print defect detection, since the defects are not constrained by the GCR strategy but are constrained by the state of the image printing system.

Another approach to solve this conversion problem is to use a more capable sensor (more than three-channel). For example, a spectrophotometer having 31-channels or more is used in color management. But the spectrophotometer has limited spatial resolution and is therefore not suitable for print defect detection. Yet another option for this conversion problem is to use a hyperspectral sensor or camera. However, a hyperspectral sensor or camera is very expensive and also has somewhat limited spatial and wavelength resolution. Moreover, even a system with high wavelength resolution, such as a spectrophotometer, is not well suited to this conversion problem, if the spectral data is limited to visible frequencies.

The present disclosure provides improvements over the prior art.

SUMMARY

According to one aspect of the present disclosure, a sensor used for determining area coverages of each colorant in a printed image is provided. The sensor includes a plurality of sensing elements for determining area coverages of each colorant in a printed image that includes a plurality of colorants including a black colorant. One of the sensing elements is an infrared sensing element that is configured to detect infrared reflection, and the others of the sensing elements are each configured to detect a visible color.

According to another aspect of the present disclosure, a computer-implemented method for determining area coverages of each colorant in a printed image is provided. The method is implemented in a computer system comprising one or more processors configured to execute one or more computer program modules. The method includes printing a test pattern in an image printing system dependent color space, the test pattern comprising a plurality of colorants including a black colorant; measuring the test pattern using a sensor to obtain image data, the image data comprising a plurality of sub-image data in a sensor dependent color space, wherein the number of sub-image data is at least equal to the number of colorants in the test pattern; deriving a transform by mapping the image data in the sensor dependent color space into the image printing system dependent color space; and applying the transform to subsequent image data obtained from the sensor to determine area coverage of the colorants.

According to yet another aspect of the present disclosure, a system for determining area coverages of each colorant in a printed image is provided. The system includes a print engine, a sensor, a processor and a controller. The print engine is configured to print a test pattern in an image printing system dependent color space. The test pattern includes a plurality of colorants including a black colorant. The sensor is configured to measure the test pattern to obtain image data. The image data includes a plurality of sub-image data in a sensor dependent color space and the number of sub-image data is at least equal to the number of colorants in the test pattern. The processor is configured to derive a transform by mapping the image data in the sensor dependent color space into the image printing system dependent color space. The controller is configured to apply the transform to subsequent image data obtained from the sensor to determine area coverage of the colorants.

Other objects, features, and advantages of one or more embodiments of the present disclosure will seem apparent from the following detailed description, and accompanying drawings, and the appended claims.

BRIEF DESCRIPTION OF THE DRAWINGS

Various embodiments will now be disclosed, by way of example only, with reference to the accompanying schematic drawings in which corresponding reference symbols indicate corresponding parts, in which.

DETAILED DESCRIPTION

The present disclosure provides a system and a method for determining CMYK components of prints (e.g., test-patterns or customer documents) using a four-channel sensor. The four-channel sensor includes RGB channels and an infrared (IR) channel. The sensor uses the property that the infrared absorbance of black (K) inks, which typically contain carbon black, is much higher than that of CMY inks As a result of this differential IR absorption, IR signals can be very effective in differentiating black (K) colorant from CMY colorants.

In describing the present disclosure, reference is made to various examples using cyan, magenta, yellow and black (CMYK) colorants to describe the method and system of the present disclosure. Generalization to other additional colorants is straightforward, however, and the use of particular examples using CMYK is not intended to limit the scope of the present disclosure.

Figure 1:
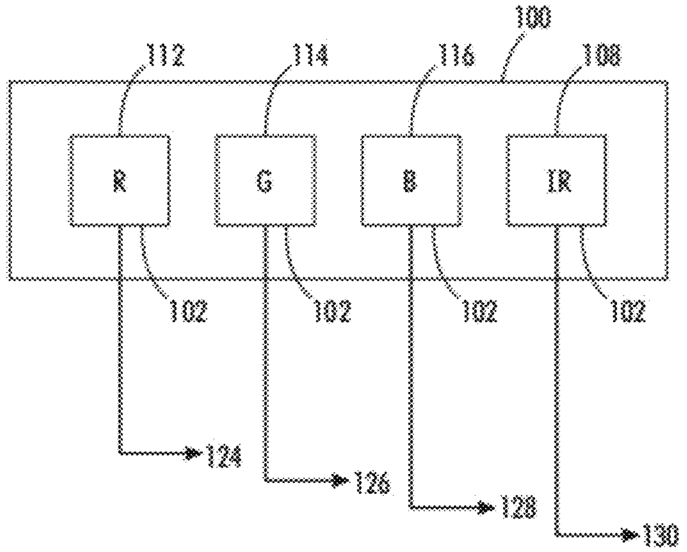
FIG. 1 illustrates an exemplary multi-channel sensor having an infrared sensing element in accordance with an embodiment of the present disclosure.
Figure 2:
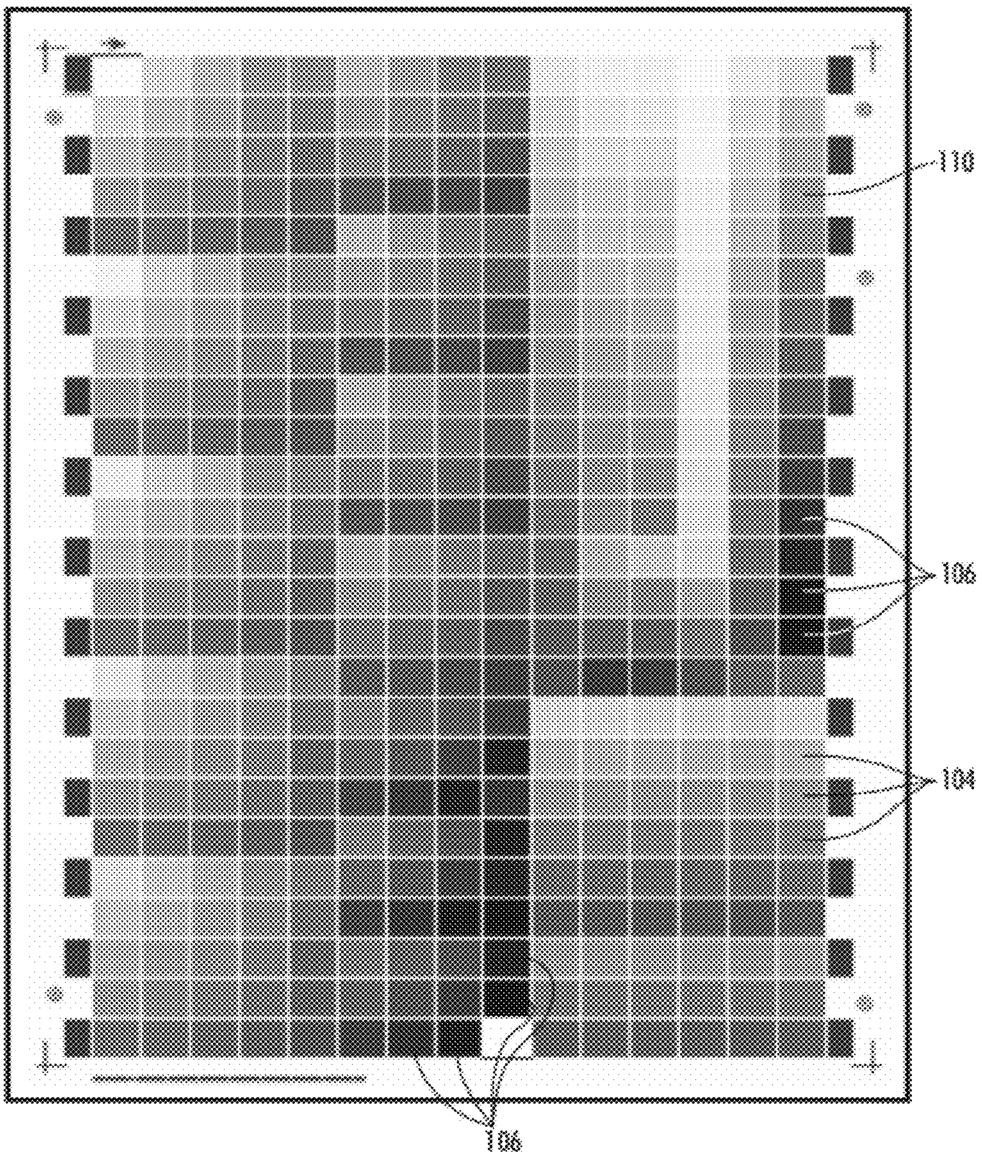
FIG. 2 illustrates an exemplary image having a plurality of colorants in accordance with an embodiment of the present disclosure.

FIGS. 1 and 2 illustrate an exemplary multi-channel sensor having an infrared sensing element and an exemplary image having a plurality of colorants, respectively, in accordance with an embodiment of the present disclosure. Referring to FIGS. 1 and 2, a sensor 100 used for determining area coverages of each colorant 104 in a printed image 110 includes a plurality of sensing elements 102. The sensor 100 is configured for detecting the image 110 that includes a plurality of colorants 104 including a black colorant 106. One of the sensing elements 102 is an infrared sensing element 108 configured to detect infrared reflection, and the others (i.e., 112, 114 and 116) of the sensing elements 102 are each configured to detect a visible color.

In one embodiment, visible color used herein refers to reflection from the Cyan (C), the Magenta (M), and the Yellow (Y) colorants in the test pattern or the image. The wavelength of visible light is between approximately 380 and 780 nanometers (nm). The wavelength of visible light corresponds to blue color (approximately 400 to 500 nanometers (nm)), green color (approximately 500 to 570 nanometers (nm)) and red color (approximately 600 to 680 nanometers (nm)). The wavelength of infrared light is between approximately 750 nanometers (nm) and 1 millimeter (mm).

The plurality of colorants 104 in the image 110 include cyan (C) colorant, magenta (M) colorant, yellow (Y) colorant and black (K) colorant 106.

In one embodiment, the number of sensing elements 102 is at least equal to or greater than the number of colorants 104 in the image 110. For example, in one embodiment, when the number of colorants 104 is four, then the sensor 100 includes at least four sensing elements 102 to detect the image 110. In such an embodiment, as noted above, at least one of the sensing elements 102 is the infrared sensing element 108. The sensing elements 102 that are configured to detect the visible color may include a red sensing element 112, a green sensing element 114, and a blue sensing element 116.

The infrared sensing element 108 configured to detect the infrared reflection may include an infrared transmitting filter. In one embodiment, the infrared sensing element 108 is configured to measure the area coverage of the black colorant 106. In another embodiment, as will be clear from the discussions below, the infrared sensing element 108 and at least one other sensing element 112, 114 or 116 are configured to measure the area coverage of the black colorant 106.

Figure 3:
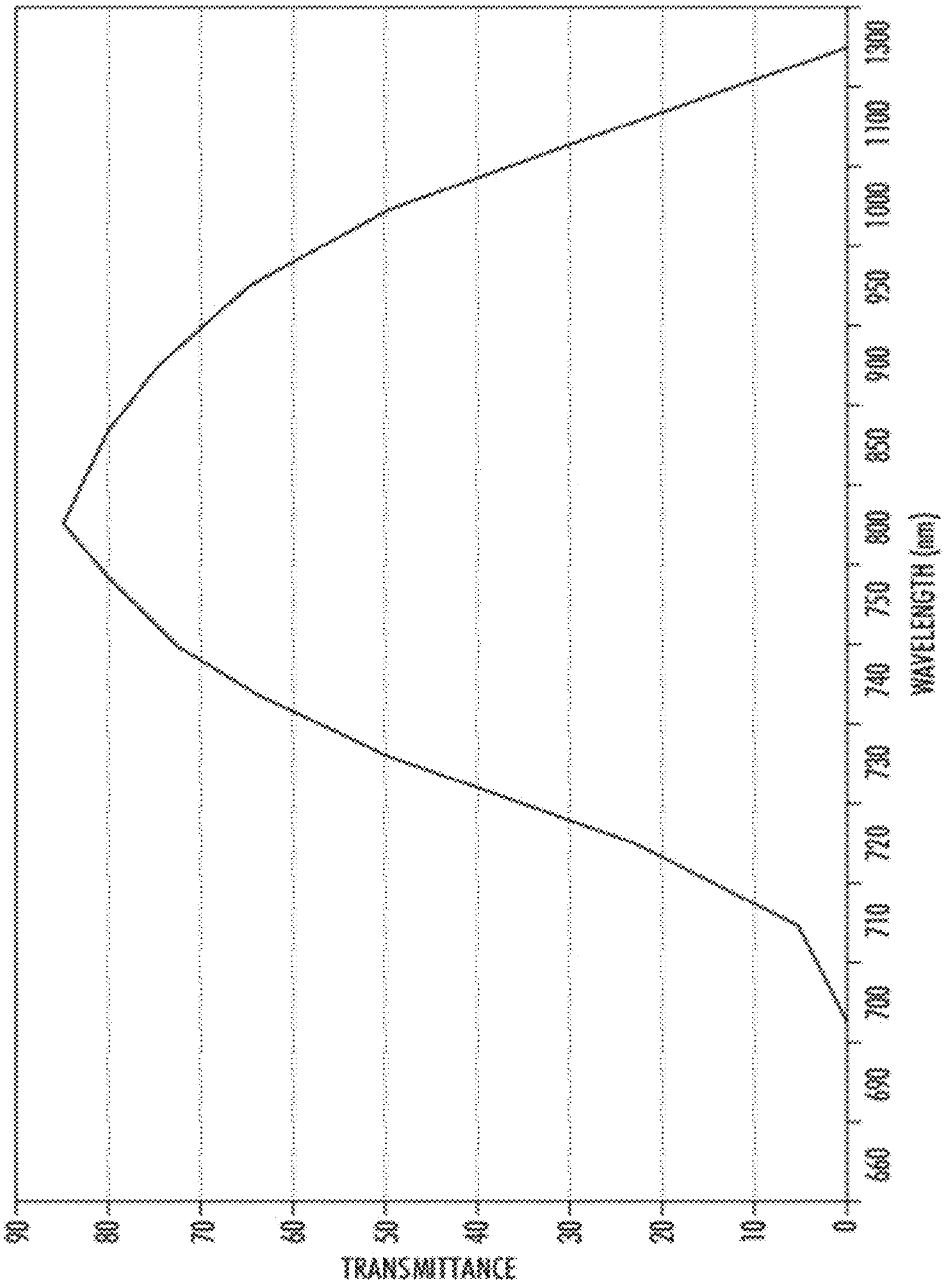
FIG. 3 is a graphical representation of transmittance spectrum of an exemplary infrared sensing element.

An exemplary IR-transmitting filter may have low transmittance below about 700 nanometers (nm) and high transmittance above about 700 nanometers (nm). For example, the IR-transmitting filter may have a transmittance spectrum similar to Hoya® RT-830 infrared bandpass filter available from Hoya Corporation USA Optics Division, a division of Hoya Corporation. FIG. 3 is a graphical representation of transmittance spectrum of an exemplary infrared filter. The graph shown in FIG. 3 shows transmittance of the exemplary infrared filter as a function of the wavelength. The graph in FIG. 3 illustrates transmittance of the exemplary infrared filter, expressed as a percentage value, on a vertical y-axis. On a horizontal x-axis, the graph in FIG. 3 illustrates the optical wavelength, expressed in nanometers (nm).

The sensor 100 described above may be used, for example, in a printer-sensor characterization method. Such printer-sensor characterization method begins by printing test patches with known CMYK that cover the printer gamut and scanning the test patches to yield corresponding RGBI sensor outputs. Here RGBI denotes the sensor output from the red, green, blue and infrared sensing elements. A mapping is then built that relates RGBI to CMYK (i.e., RGBI CMYK). This mapping may then be used for determining CMYK components of subsequent prints, and therefore, for example, diagnosing print defects. The characterization procedures may be updated if the printer or sensor drifts beyond calibration tolerance. The determined CMYK values can also be used for other applications, such as calibrating the image printing system, device-independent color measurement, etc.

Figure 4:
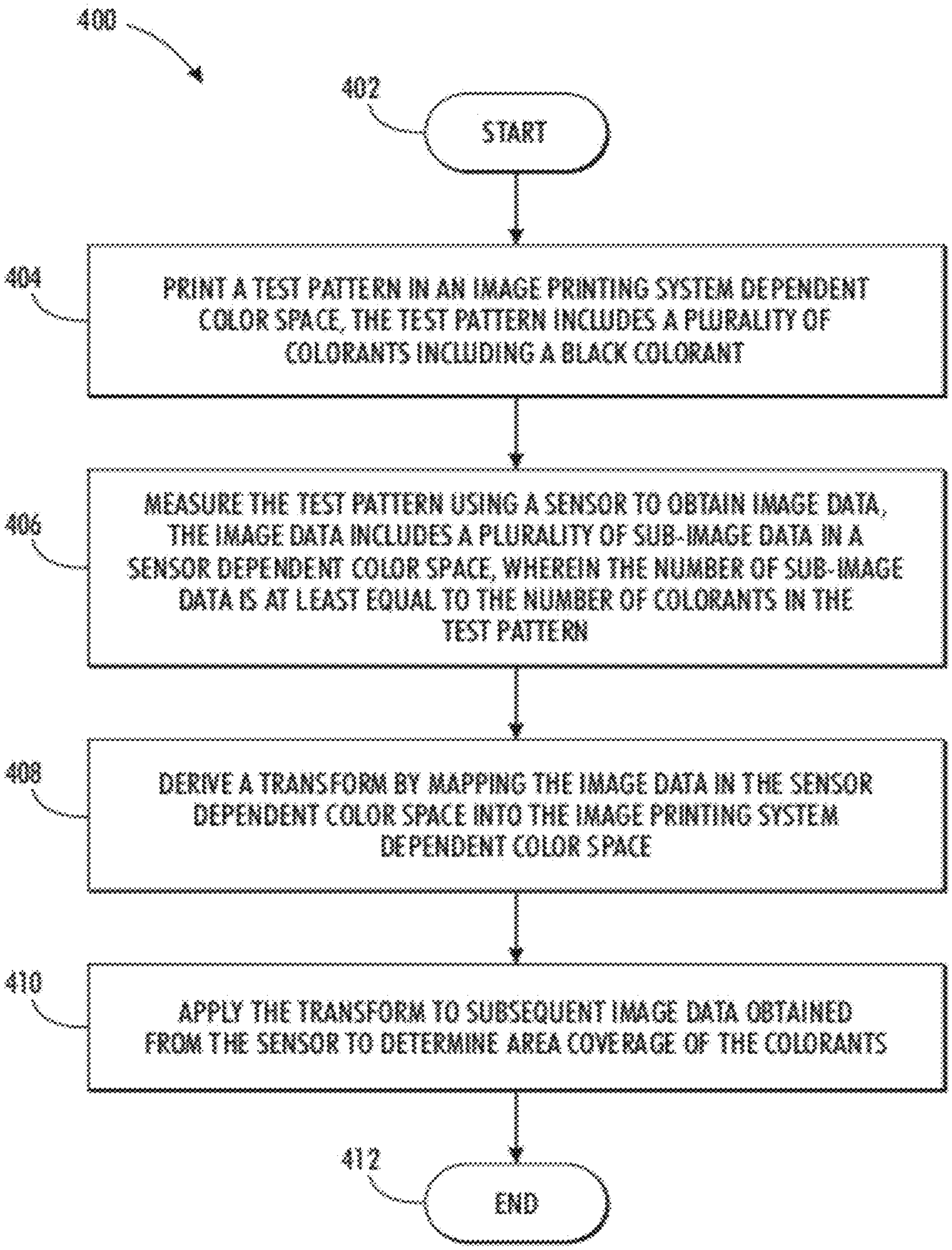
FIG. 4 illustrates a method for determining area coverages of each colorant in a printed image in accordance with an embodiment of the present disclosure.

FIG. 4 provides a method 400 for diagnosing print defects in accordance with an embodiment of the present disclosure. The method 400 is a computer-implemented method that is implemented in a computer system comprising one or more processors 504 (as shown in and explained with respect to FIG. 5) configured to execute one or more computer program modules.

Figure 5:
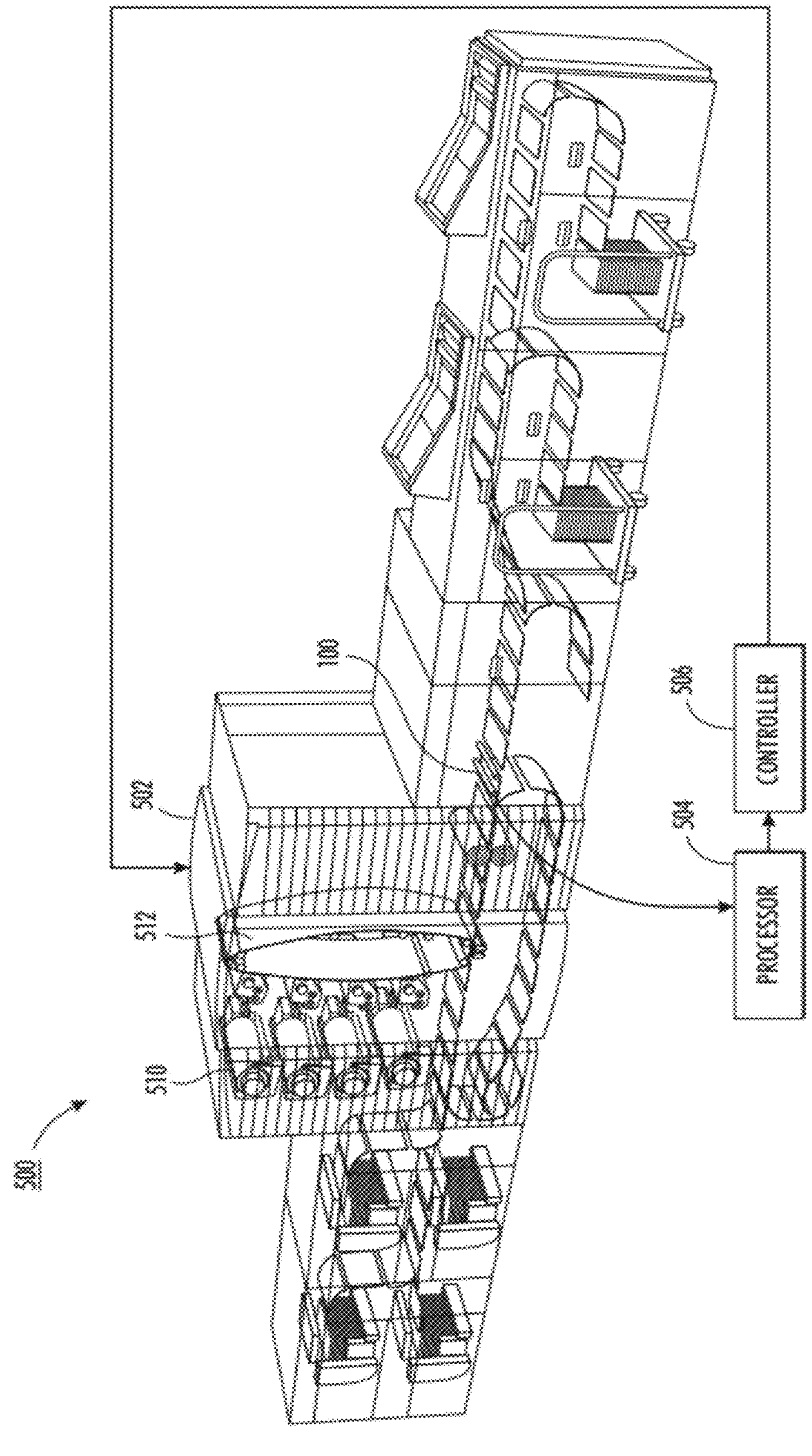
FIG. 5 illustrates a system for determining area coverages of each colorant in a printed image in accordance with an embodiment of the present disclosure.
Figure 8:
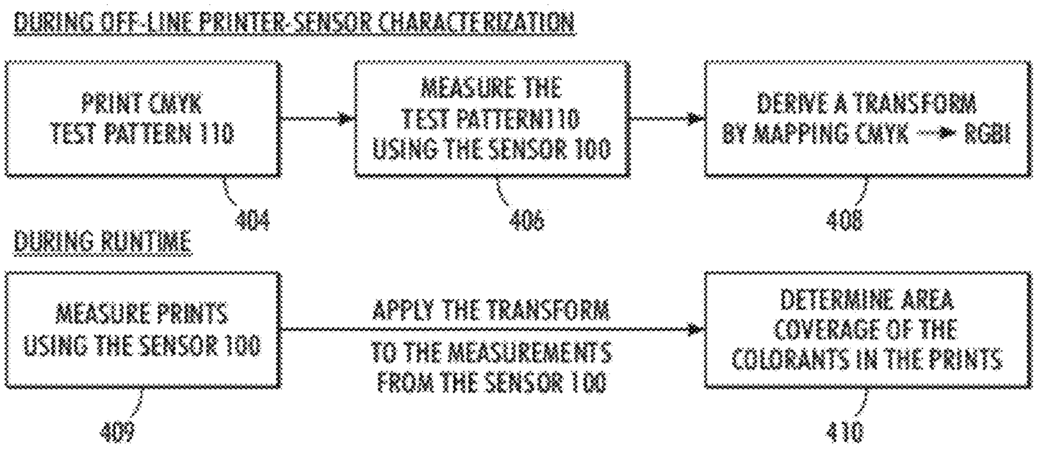
FIG. 8 illustrates the method for determining area coverages of each colorant in the printed image in accordance with an embodiment of the present disclosure.

Referring to FIGS. 4 and 8, the method 400 begins at procedure 402. At procedure 404, a test pattern is printed in an image printing system dependent color space. In one embodiment, the image printing system dependent color space is a CMYK color space. In one embodiment, a print engine 502 (as shown in FIG. 5) is configured to print a test pattern in the image printing system dependent color space. In one embodiment, the test pattern includes a plurality of colorants including a cyan colorant, a magenta colorant, a yellow colorant and the black colorant.

At procedure 406, the test pattern is detected using the sensor 100 (as shown and explained with respect to FIG. 1) to obtain image data. The image data includes a plurality of sub-image data in a sensor dependent color space. In one embodiment, the sensor dependent color space is an RGBI color space.

Each sub-image data herein refers to an output provided by a channel of the sensor 100. Referring to FIG. 1, sub-image data 124, sub-image data 136, sub-image data 128, and sub-image data 130 correspond to output provided by the red sensing element 112, the green sensing element 114, the blue sensing element 116, and the infrared sensing element 108, respectively.

The number of sub-image data is at least equal to the number of colorants in the test pattern. For example, if the test pattern includes four colorants, namely, cyan (C) colorant, magenta (M) colorant, yellow (Y) colorant and black (K) colorant, then the image data includes, for example, four sub-image data, namely, red channel output data, green channel output data, blue channel output data, and infrared channel output data.

In general, the non-black colorants of the test pattern (i.e., mixture of CMY) cannot be detected individually by the channels of the sensor (i.e., Red channel, Green channel and Blue channel). Therefore, a mapping is built that relates the colorants of the test pattern to the channels of the sensor. For example in case of RGB to CMY, the mapping includes, for example, a 3-to-3 lookup table (LUT) rather than 3 individual one-to-one LUTs.

At procedure 408, a transform is derived by mapping the image data in the sensor dependent color space into the image printing system dependent color space. That is, the mapping relates RGBI to CMYK (i.e., RGBI→CMYK). The transform may be in the form of a 4-to-4 look-up table (LUT), or a plurality of 3-to-3 look-up tables (LUTs), where each look-up table (LUT) corresponds to a different value of the black colorant. A method of forming LUTs for mapping the image data in the sensor dependent color space into the image printing system dependent color space is explained in detail in U.S. Pat. No. 7,295,703 titled "Method for scanner characterization for color measurement of printed media having four or more colorants," which herein is incorporated by reference in its entirety.

The transform may be in the form of a cluster model. In such a case, the image data from the sensor 100 is classified into groups or clusters and then each group or cluster is parameterized to construct the cluster model. The cluster model includes cluster selection (or cluster assignment) followed by regression with an input vector (e.g., RGBI or additional higher order terms from RGBI such as $R^2$, $G^2$, $B^2$, etc.). The regression matrices, $A_i$ for i=1 to N (where N is number of clusters), are obtained by performing Least Square algorithm on the clustered input-output data. A method of forming cluster model for mapping the image data in the sensor dependent color space into the image printing system dependent color space is explained in detail, for example, in U.S. patent application Ser. No. 12/969,854 (filed on Dec. 16, 2010) to Wencheng Wu, Lalit K Mestha, and Edul N Dalal titled "Updating a smoothness constrained cluster model for color control in a color management system," which is hereby incorporated by reference in its entirety.

At procedure 409 (as shown in FIG. 8), during runtime, the sensor 100 is configured to measure the prints (e.g., inserted test-patterns or customer documents). At procedure 410, the transform is applied to subsequent image data obtained from the sensor 100 to determine area coverage of the colorants. The subsequent image data herein refers to image data of prints that are detected by the sensor 100 during runtime. That is, the transform obtained at procedure 408 is applied to the measurements or image data of the prints obtained from the sensor 100 during runtime to determine CMYK values.

The determined area coverage of the colorants may then be used, for example, for diagnosing print defects. The determined area coverage of the colorants can also be used for other applications, such as calibrating the image printing system, device-independent color measurement, etc. The method 400 ends at procedure 412.

Referring to FIG. 8, the procedures 404, 406, and 408 are generally done off-line and are performed infrequently or frequently to derive the transform (i.e., RGBI→CMYK). Here "off-line" refers to performing the procedures 404, 406, and 408 at a time other than at (or during) runtime. The transform is derived in advance of the run time procedures 409 and 410. In the method of the present disclosure generally all that is done at runtime is applying the transform to subsequent image data obtained from the sensor.

The transform may be updated at a later time according to a preselected (e.g., by a user) schedule, a user request or upon some trigger. For example, if it is determined that the printer or sensor drifted beyond a calibration tolerance, then the characterization procedures 404, 406, and 408 may be performed to update the transform.

FIG. 5 illustrates a system 500 for diagnosing print defects in accordance with an embodiment of the present disclosure. The system 500 includes the printing engine 502, the processor 504, a controller 506, and the sensor 100.

As illustrated, the print engine 502 is a multi-color engine having a plurality of imaging/development subsystems 510, which are suitable for producing individual color images (e.g., CMYK) on an image bearing surface 512, where the image bearing surface 512 then transfers the images to the substrate. The system 500 also includes a source of paper or printable substrates.

As is generally known, to generate an output print of a digital input document, the image bearing surface 512 is charged using a corona charger (not shown) and then exposed to a raster output scanner (laser) (not shown) to form the latent image on the image bearing surface 512. Toner is applied to the latent image from a plurality of developer units 510. The toner applied to the latent image is transferred to the output media at a transfer station. The output media is moved by a transport mechanism to a fuser so that the toner is permanently affixed to the output media.

Referring to FIG. 5, the print engine 502 is configured to print a test pattern in an image printing system dependent color space. In one embodiment, the image printing system dependent color space is a CMYK color space. In one embodiment, the test pattern includes a plurality of colorants including a cyan colorant, a magenta colorant, a yellow colorant and the black colorant.

The sensor 100 is configured to measure the test pattern to obtain image data. The image data includes a plurality of sub-image data in a sensor dependent color space. In one embodiment, the sensor dependent color space is an RGBI color space. Referring to FIG. 1, sub-image data 124, sub-image data 136, sub-image data 128, and sub-image data 130 correspond to output provided by the red sensing element 112, the green sensing element 114, the blue sensing element 116, and the infrared sensing element 108, respectively. The number of sub-image data is at least equal to the number of colorants in the test pattern.

The processor 504 can comprise either one or a plurality of processors therein. Thus, the term "processor" as used herein broadly refers to a single processor or multiple processors. In one embodiment, the processor 504 can be a part of or forming a computer system. The system 500 may include a memory to store data received and data generated by the processor 504. The memory may be part of the processor 504.

The processor 504 is configured to derive a transform by mapping the image data in the sensor dependent color space into the image printing system dependent color space. The transform relates the colorants of the test pattern to the channels of the sensor. The transform may be stored in memory. As noted above, the transform may be in the form of a 4-to-4 look-up table (LUT) ("RGBI-to-CMYK LUT"), or a plurality of 3-to-3 look-up tables (LUTs), where each look-up table (LUT) corresponds to a different value of the black colorant. The transform may be in the form of a cluster model.

The controller 506 is configured to apply the transform to subsequent image data obtained from the sensor to determine area coverage of the colorants. The controller 506 is configured to use the determined CMYK values to (a) diagnose print defects, (b) calibrate the image printing system, or (c) perform device-independent color measurement. For example, U.S. Pat. No. 7,376,269 to Klassen et al. titled "Systems and methods for detecting image quality defects" and U.S. Pat. No. 7,783,122 to Wu et al. titled "Banding and streak detection using customer documents," both of which are hereby incorporated by reference in their entirety, disclose methods to determine print defects in the image using the detected area coverage of the colorants in the image.

In one embodiment, the method of the present disclosure was implemented in MATLAB and tested using a simulation experiment as discussed below. To demonstrate the efficacy of the method 400, the method 400 was tested experimentally using a simulated IR signal. That is, the aspects of the present disclosure were experimentally verified using an RGB sensor and a simulated IR signal.

In the simulation experiment (using the aspects of the present disclosure described above), a test pattern with 1680 patches was first printed. The 1680 patches of the test pattern included 1296 patches that comprised the training set, as well as 52 pure K steps, 52 equal CMY (non-K) steps and 280 various random CMYK patches.

Figure 6:
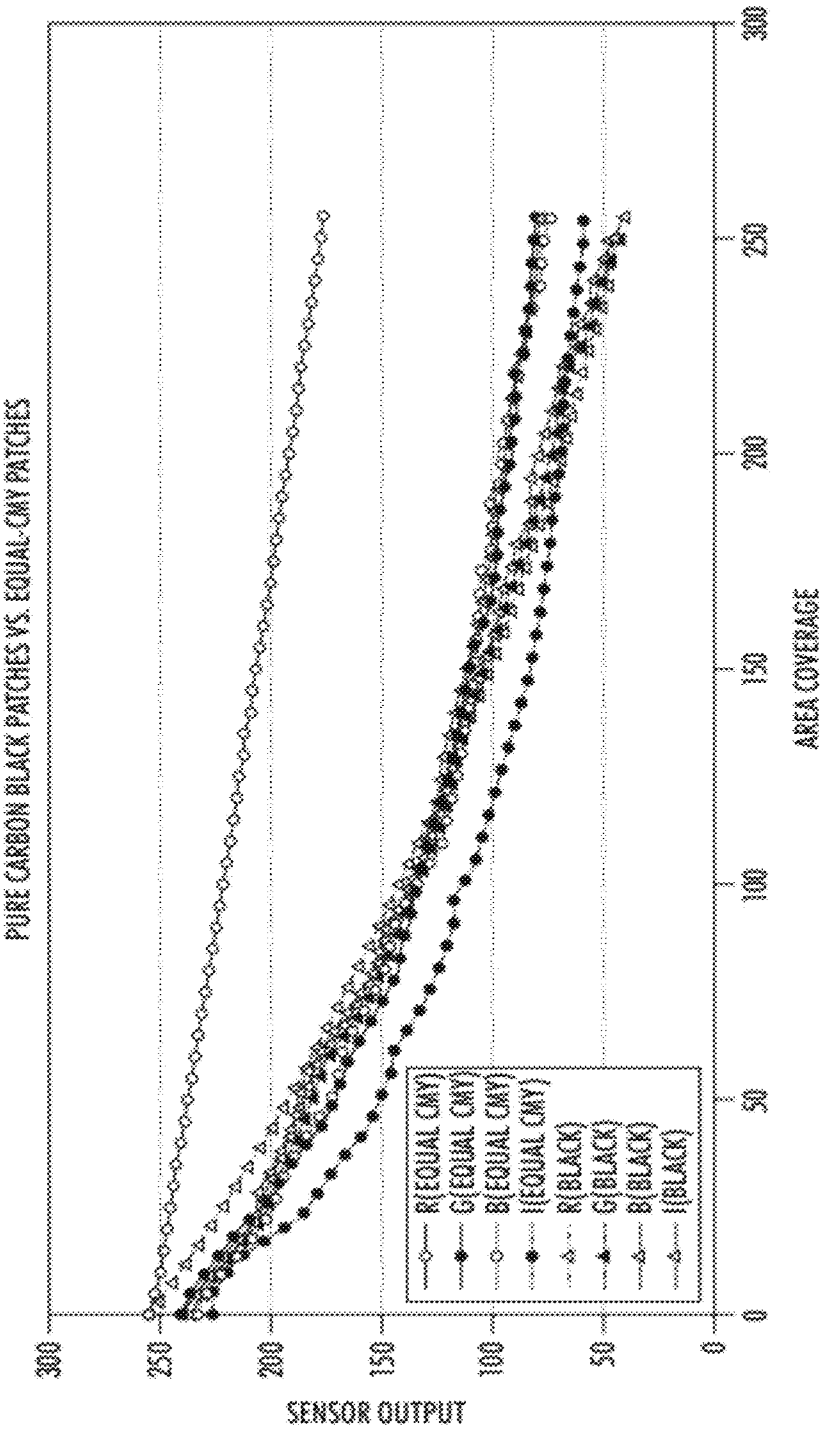
FIG. 6 is a graphical representation of sensor outputs for pure K black patches and for equal-CMY (non-K black) patches in accordance with an embodiment of the present disclosure.

FIG. 6 is a graphical representation of sensor outputs for pure black patches and for equal-CMY (non-K) patches in accordance with an embodiment of the present disclosure. The graph shown in FIG. 6 shows sensor output as a function of the area coverage of the colorants. The graph in FIG. 6 illustrates sensor output on a vertical y-axis and the area coverage of the colorants on a horizontal x-axis.

The 52 pure K patches and 52 equal-CMY (non-K) patches of the test pattern are generally among the most difficult test sets for systems having only RGB sensor outputs. As shown in FIG. 6, the RGB sensor outputs for pure K patches and equal-CMY (non-K) patches are very similar in all aspects (i.e., absolute value, ratio between R, G, & B, etc.). This illustrates that the RGB sensor outputs alone are not sufficient to resolve or convert back to CMYK accurately.

Also as shown in FIG. 6, the IR signal (I) from pure K can be easily differentiated from the IR signal (I) from equal-CMY (non-K). As noted above, the IR channel of the sensor uses high IR absorption properties of black (K) inks that typically include carbon black. That is, the additional IR signal (I) improves the differentiation of pure K vs. equal-CMY (non-K) greatly without any assumptions about the GCR. This ability is particularly useful when diagnosis of the print defect is done on customer documents rather than test patterns, since multiple GCR's can be used on a single customer page depending on preference, contents, etc.

All the 1680 patches were measured with a document scanner configured to measure RGB values of the test pattern. The outputs from the scanner were then expanded to RGBI, where the I's are the simulated IR signals of the printed patches, generated using a method 700 (as shown and explained with respect to FIG. 7). Thus, the experiment used a set of 1680 input CMYK patches to obtain their corresponding 4-channel sensor outputs RGBI.

Once the four-channel sensor outputs RGBI were obtained, an RGBI→CMYK mapping was obtained to test the accuracy of this proposed system and method. The look-up table (LUT) approach or the cluster model approach (both described above) was used to obtain the RGBI→CMYK mapping.

For comparison purposes, the simplest method of building a LUT with 17 equally-spaced nodes was applied, to correlate RGBI→CMYK (present disclosure) and RGBI→CMYK (conventional/prior art), using only the training set, and then to test the LUT accuracy on all 1680 sample patches. The results are shown in Table 1. It is very clear from the results of Table 1 that the method 400 of the present disclosure performs better than the conventional (prior art) method with the addition of the IR-channel.

TABLE 1

| | | ALL (1680 patches) | Training Set | 52 pure K patches and & 52 equal CMY (non-K) patches | 280 random CMYK patches |
|---|---|---|---|---|---|
| RGBI→CMYK | C | 4.5% | 4.6% | 4.1% | 4.1% |
| (the present | M | 3.9% | 4.1% | 2.8% | 3.4% |
| disclosure) | Y | 6.1% | 6.3% | 6.5% | 5.1% |
| | K | 0.8% | 0.7% | 0.9% | 0.8% |
| | ALL | 3.8% | 3.9% | 3.6% | 3.4% |
| RGB→CMYK | C | 13.9% | 13.3% | 24.0% | 12.7% |
| (Conventional | M | 9.6% | 9.5% | 13.2% | 8.4% |
| (prior art) | Y | 18.1% | 17.7% | 28.9% | 15.6% |
| system) | K | 9.2% | 8.6% | 18.9% | 8.4% |
| | ALL | 12.7% | 12.3% | 21.3% | 11.3% |

As can be clearly seen from the results of Table 1, the method of the present disclosure is more accurate for all 1680 sample patches of the test pattern. The method 400 of the present disclosure is especially more accurate in pure K patches because the IR-channel provides an excellent way to detect pure K.

RGB channels can be better optimized if one can also specify the RGB filters in the sensor. For example, one can select RGB filters whose spectral sensitivity curves are closer to being complementary to the spectral curves of printer CMY colorants. Other sophisticated method such as the method described in Reference: "Imaging Colorimetry Using a Digital Camera," Journal of Imaging Science and Technology, Vol. 44, No. 4, pp. 267-279, July/August 2000, Wencheng Wu, J. P. Allebach, Mostafa Analoui, can be used to select the RGB filters as well.

As can be seen from Table 1, the conventional (prior art) method, which suffers especially in differentiating equal CMY (non-K) from pure K, is three times less accurate than the method of the present disclosure. The errors in the conventional method are almost doubled for pure K & equal CMY (non-K) patches due to the fact that the conventional (prior art) method cannot differentiate equal CMY (non-K) from pure K. In contrast, the IR-channel used in the present disclosure provides a way to detect pure K and therefore the method of the present disclosure is more accurate in pure K patches.

In one embodiment, in order to improve the accuracy of a direct RGBI-to-CMYK LUT (i.e., 4-to-4 transform), a plurality of 3-to-3 look-up tables (LUTs), where each look-up table (LUT) corresponds to a different value of the black colorant, may be applied.

The "RGBI-to-CMYK LUT" approach allows the flexibility to allocate different nodes on pure K vs. on RGB. In order to do that, an RI→CK mapping is first used to estimate the actual pure K values on printed patches. Then corresponding RGB→CMY LUT's are used to estimate C (refinement), M, and Y values on printed patches. Rather than using I→K directly, the RI→CK mapping may be used because, although the absorbance of M & Y in IR is near 0, the absorbance of C is still about 20% of that of K (see FIG. 7), thus the infrared absorbance of C is not negligible. Therefore, it is important to use an additional channel such as R (which is complementary to C) to better decouple the IR signal that is not coming from K alone.

The simulated IR signals of the printed patches used in the above experiment were generated using the method 700 as described below. The simulated IR signals are used in the above described experiment to demonstrate the efficacy of the method 400 for determining colorants in an image. The simulated IR signals may also be used to determine the correct type of the infrared filter for a particular printer. That is, via simulation one can better customize the IR transmittance filter that best differentiates K from CMY for each printer product family.

Figure 7:
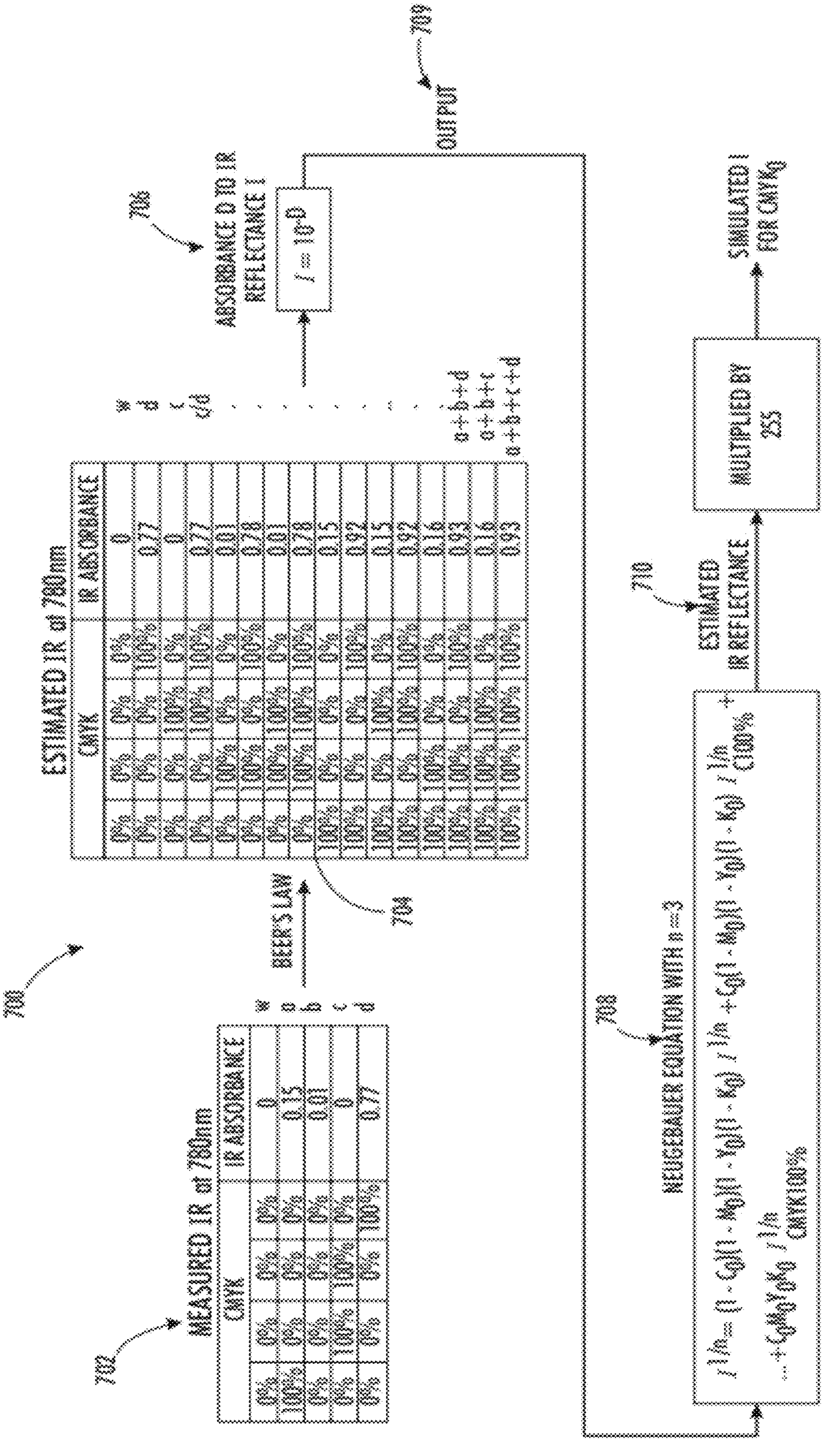
FIG. 7 illustrates an exemplary method used to simulate IR channel of printed patches in accordance with an embodiment of the present disclosure.

Referring to FIG. 7, at procedure 702, IR absorbance (at 780 nanometers (nm)) of the four colorants: C100%, M100%, Y100%, K100% were measured. At procedure 704, Beer's law (i.e., additivity in absorbance space) was used to calculate the estimated IR absorbance (at 780 nm) of the secondary and tertiary Neugebauer primaries.

Beer's law simulation of the IR signal from any CMYK combination is briefly explained here. All computations below are at wavelength $\lambda$=780 nm, and are based on Beer's law (additivity in absorbance space). First, IR absorbance $A_i$ (at 780 nm) of each of the four (e.g., C, M, Y, K) colorants is calculated based on measured IR reflectances of the 100% primary colorants C, M, Y, K using the equation A below:

$$A_i = -\log\left(\frac{R_i}{R_p}\right) \quad \text{Equation (A)}$$

where $A_i$ is the absorbance of each colorant i;

$R_i$ is the measured IR reflectance of each colorant i; and $R_p$ is the measured IR reflectance of the substrate p.

Next, the IR reflectances (at 780 nm) of the secondary, tertiary (and quaternary) Neugebauer primaries are calculated using Equation B below:

$$R_N = R_p \cdot \exp(-\Sigma_i(A_i)) \quad \text{Equation (B)}$$

where $A_i$ is the absorbance of each colorant i;

$R_N$ is the IR reflectance of the secondary and tertiary Neugenauer primaries; and $R_p$ is the measured IR reflectance of the substrate p.

The Neugebauer model has been widely used to predict the colorimetric response of halftone color printers. The original model is essentially an extension of the Murray-Davies equation. The color of a print is predicted as the weighted average of the colors of the printing primaries (e.g., CMYK) and their overprints, where the weights are determined by the relative dot area coverages on the print. In an example case of CMYK printers, there are 16 basis colors, including white and all possible combinations of the four color mixtures. The 16 basis colors are referred to as the Neugebauer primaries.

The secondary Neugebauer primaries are all two-member combinations of 100% primaries C, M, Y, K that is: CM, CY, CK, MY, MK, YK. The tertiary Neugebauer primaries are all three-member combinations of 100% primaries C, M, Y, K that is: CMY, CYK, CMK, MYK.

The estimated IR absorbance was converted into a reflectance space at procedure 706. At procedure 708, the Neugebauer equation (with Yule-Nelson parameter n=3) is applied to output 709 to estimate IR reflectance 710 of all CMYK combinations, and thus their IR signal (multiply by 255) if captured by an IR sensor. The simulated IR signal (I) of a printed patch ($CMYK_0$) is output by the method 700.

The present disclosure thus provides an N-channel sensor, where N (the number of channels of the sensor) is greater than or equal to the number of colorants in the image printing system. The sensor of the present disclosure is configured to quantitatively determine the colorants in any given scanner pixel. As noted above, once the CMYK values are determined, that information can be used for diagnosing print defects. Diagnosing print defects herein refers to determining which of the C, M, Y or K colorants contributed to the print defects (e.g., streaks) and not merely detecting the presence of the print defects (e.g., streaks). The determined CMYK values can also be used for other applications, such as calibrating the image printing system, device-independent color measurement, etc.

The method and the system of the present disclosure can accurately characterize the CMYK components of prints by using an IR sensor in addition to the conventional RGB sensor. In case of the IR signal from the IR sensor, since CMY colorants have very weak signals (almost close to none for MY colorants), black (K) colorant can be differentiated from CMY colorants using the IR signal alone. Additionally, one can use IR and R-channels (i.e., complementary of Cyan, since IR signal for Cyan is weak but not zero) to differentiate black (K) colorant as discussed above. Also, as noted above, the carbon black in the black (K) inks enables effective differentiation of infrared signals of black (K) colorant from the CMY colorants thus overcoming prior limitations in detecting CMYK colorants from a conventional RBG sensor.

Image data used herein "defines" an image when the image data (or sub-image data) includes sufficient information to produce the image. Scanner used herein is an image input device that receives an image by a scanning operation, for example, by illuminating a document and recording the level or intensity of various colors of light reflected from the surface of the document.

In embodiments of the present disclosure, the processor, for example, may be made in hardware, firmware, software, or various combinations thereof The present disclosure may also be implemented as instructions stored on a machine-readable medium, which may be read and executed using one or more processors. In one embodiment, the machine-readable medium may include various mechanisms for storing and/or transmitting information in a form that may be read by a machine (e.g., a computing device). For example, a machine-readable storage medium may include read only memory, random access memory, magnetic disk storage media, optical storage media, flash memory devices, and other media for storing information, and a machine-readable transmission media may include forms of propagated signals, including carrier waves, infrared signals, digital signals, and other media for transmitting information. While firmware, software, routines, or instructions may be described in the above disclosure in terms of specific exemplary aspects and embodiments performing certain actions, it will be apparent that such descriptions are merely for the sake of convenience and that such actions in fact result from computing devices, processing devices, processors, controllers, or other devices or machines executing the firmware, software, routines, or instructions.

While the present disclosure has been described in connection with what is presently considered to be the most practical and preferred embodiment, it is to be understood that it is capable of further modifications and is not to be limited to the disclosed embodiment, and this application is intended to cover any variations, uses, equivalent arrangements or adaptations of the present disclosure following, in general, the principles of the present disclosure and including such departures from the present disclosure as come within known or customary practice in the art to which the present disclosure pertains, and as may be applied to the essential features hereinbefore set forth and followed in the spirit and scope of the appended claims.

What is claimed is:

1. A computer-implemented method for determining area coverages of each colorant in a printed image that includes a plurality of colorants including a black colorant, wherein the method is implemented in a computer system comprising one or more processors configured to execute one or more computer program modules, the method comprising:

obtaining image data of the printed image using a sensor having a plurality of sensing elements, wherein one of the sensing elements is an infrared sensing element configured to detect infrared reflection, and the others of the sensing elements are each configured to detect a visible color;

determining the area coverage of the black colorant using output from the infrared sensing element and from at least one other sensing element; and determining the area coverages of the remaining of the plurality of colorants using output from the sensing elements other than the infrared sensing element, together with the determined area coverage of the black colorant.

2. The method of claim 1, wherein the at least one other sensing element is a red sensing element.

3. The method of claim 1, wherein the plurality of sensing elements include at least four sensing elements.

4. A system for determining area coverages of each colorant in a printed image that includes a plurality of colorants including a black colorant, the system comprising:

a sensor configured to measure the printed image to obtain image data, wherein one of the sensing elements is an infrared sensing element configured to detect infrared reflection, and the others of the sensing elements are each configured to detect a visible color;

a processor configured to:

determine the area coverage of the black colorant using output from the infrared sensing element and from at least one other sensing element; and determine the area coverages of the remaining of the plurality of colorants using output from the sensing elements other than the infrared sensing element, together with the determined area coverage of the black colorant.

5. The system of claim 4, wherein the at least one other sensing element is a red sensing element.

6. The system of claim 4, wherein the number of sensing elements is at least equal to or greater than the number of colorants in the test pattern.

7. The system of claim 4, wherein the plurality of sensing elements include at least four sensing elements.

8. The system of claim 4, wherein the sensing elements configured to detect the visible color include a red sensing element, a green sensing element, and a blue sensing element.

9. The system of claim 4, wherein the plurality of colorants includes a cyan colorant, a magenta colorant, a yellow colorant and the black colorant.

10. The system of claim 4, wherein the processor is configured to:

derive a transform by mapping the image data in a sensor dependent color space into an image printing system dependent color space, the transform comprises a 4-to-4 look-up table, a plurality of 3-to-3 RGB->CMY look-up tables, each look-up table corresponds to a different determined area coverage value of the black colorant, or a cluster model; and apply the transform to subsequent image data obtained from the sensor to determine area coverage of the remaining of the plurality of colorants.

11. The method of claim 1, wherein the number of sensing elements is at least equal to or greater than the number of colorants in the printed image.

12. The method of claim 1, wherein the plurality of colorants includes a cyan colorant, a magenta colorant, a yellow colorant and the black colorant.

13. The method of claim 1, wherein the sensing elements configured to detect the visible color include a red sensing element, a green sensing element, and a blue sensing element.

14. The method of claim 1, wherein the determined area coverages of the colorants are used in determining which of the plurality of colorants contributed to print defects.

15. The method of claim 1, wherein the determining the area coverages of the remaining of the plurality of colorants includes:

deriving a transform by mapping the image data in a sensor dependent color space into an image printing system dependent color space, the transform comprises a 4-to-4 look-up table, a plurality of 3-to-3 RGB->CMY look-up tables, each look-up table corresponds to a different determined area coverage value of the black colorant, or a cluster model; and applying the transform to subsequent image data obtained from the sensor to determine area coverage of the remaining of the plurality of colorants.

16. The system of claim 4, wherein the determined area coverages of the colorants are used in determining which of the plurality of colorants contributed to print defects.

* * * * *